United States Patent
Nassar et al.

(10) Patent No.: US 11,087,220 B2
(45) Date of Patent: *Aug. 10, 2021

(54) CONFIDENCE WEIGHTING OF COMPLEX RELATIONSHIPS IN UNSTRUCTURED DATA

(71) Applicant: International Business Machines Corporation, Armonk, NY (US)

(72) Inventors: Ahmed M. A. Nassar, Katy, TX (US); Victoria O. Odeyemi, Toronto (CA); Eman Omar, Katy, TX (US); Craig M. Trim, Sylmar, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1130 days.

This patent is subject to a terminal disclaimer.

(21) Appl. No.: 15/589,008

(22) Filed: May 8, 2017

(65) Prior Publication Data

US 2017/0243118 A1   Aug. 24, 2017

Related U.S. Application Data

(63) Continuation of application No. 14/627,479, filed on Feb. 20, 2015.

(51) Int. Cl.
| | |
|---|---|
| *G06N 5/02* | (2006.01) |
| *G06N 7/00* | (2006.01) |
| *G06N 3/08* | (2006.01) |
| *G06N 20/00* | (2019.01) |
| *G06F 16/00* | (2019.01) |
| *G06F 16/31* | (2019.01) |
| *G06F 16/33* | (2019.01) |

(Continued)

(52) U.S. Cl.
CPC ............. *G06N 5/022* (2013.01); *G06F 16/00* (2019.01); *G06F 16/322* (2019.01); *G06F 16/334* (2019.01); *G06F 16/9024* (2019.01); *G06F 40/295* (2020.01); *G06F 40/35* (2020.01); *G06F 40/40* (2020.01); *G06N 3/08* (2013.01); *G06N 7/005* (2013.01); *G06N 20/00* (2019.01)

(58) Field of Classification Search
CPC ................................................... G06N 5/022
USPC ......................................................... 706/12
See application file for complete search history.

(56) References Cited

U.S. PATENT DOCUMENTS

2009/0012842 A1* 1/2009 Srinivasan .............. G06F 40/30
705/12

OTHER PUBLICATIONS

Appendix P, 2017.

* cited by examiner

*Primary Examiner* — Lut Wong
(74) *Attorney, Agent, or Firm* — Garg Law Firm, PLLC; Rakesh Garg; Anthony England

(57) ABSTRACT

For confidence weighting relationships between complex entities in unstructured data an expressed relationship between a subset of a set of tokens is extracted from a knowledge graph corresponding to the unstructured data. The knowledge graph includes the set of tokens. The tokens in the subset of tokens are related in the expressed relationship by a set of predicates. A number of occurrences of the set of predicates in the unstructured data is determined. A number of occurrences of the expressed relationship in the unstructured data is determined. Using the number of occurrences of the set of predicates and the number of occurrences of the expressed relationship, a confidence value is computed and assigned to the expressed relationship.

18 Claims, 13 Drawing Sheets

(51) Int. Cl.
*G06F 16/901* (2019.01)
*G06F 40/35* (2020.01)
*G06F 40/40* (2020.01)
*G06F 40/295* (2020.01)

*FIGURE 4*

```xml
<node object="likely" object-sequence="7" predicate="root" subject="ROOT" subject-sequence="0">
  <node object="deposition" object-sequence="4" predicate="nsubj" subject="likely" subject-sequence="7">
    <node object="Ammonium" object-sequence="1" predicate="nn" subject="deposition" subject-sequence="4"/>
    <node object="chloride" object-sequence="2" predicate="nn" subject="deposition" subject-sequence="4"/>
    <node object="salt" object-sequence="3" predicate="nn" subject="deposition" subject-sequence="4"/>
  </node>
  <node object="is" object-sequence="5" predicate="cop" subject="likely" subject-sequence="7"/>
  <node object="most" object-sequence="6" predicate="advmod" subject="likely" subject-sequence="7"/>
  <node object="occur" object-sequence="9" predicate="xcomp" subject="likely" subject-sequence="7">
    <node object="to" object-sequence="8" predicate="aux" subject="occur" subject-sequence="9"/>
    <node object="in" object-sequence="10" predicate="prep" subject="occur" subject-sequence="9">
      <node object="exchangers" object-sequence="12" predicate="pobj" subject="in" subject-sequence="10">
        <node object="heat" object-sequence="11" predicate="nn" subject="exchangers" subject-sequence="12"/>
      </node>
    </node>
    <node object="cooled" object-sequence="18" predicate="advcl" subject="occur" subject-sequence="9">
      <node object="where" object-sequence="13" predicate="advmod" subject="cooled" subject-sequence="18"/>
      <node object="stream" object-sequence="16" predicate="nsubjpass" subject="cooled" subject-sequence="18">
        <node object="the" object-sequence="14" predicate="det" subject="stream" subject-sequence="16"/>
        <node object="process" object-sequence="15" predicate="nn" subject="stream" subject-sequence="16"/>
      </node>
      <node object="is" object-sequence="17" predicate="auxpass" subject="cooled" subject-sequence="18"/>
      <node object="below" object-sequence="19" predicate="prep" subject="cooled" subject-sequence="18">
        <node object="temperature" object-sequence="24" predicate="pobj" subject="below" subject-sequence="19">
          <node object="the" object-sequence="20" predicate="det" subject="temperature" subject-sequence="24"/>
          <node object="NH4Cl" object-sequence="21" predicate="nn" subject="temperature" subject-sequence="24"/>
          <node object="salt" object-sequence="22" predicate="nn" subject="temperature" subject-sequence="24"/>
          <node object="deposition" object-sequence="23" predicate="nn" subject="temperature" subject-sequence="24"/>
          <node object="Ammonium" object-sequence="1" predicate="nn" subject="deposition" subject-sequence="4"/>
          <node object="chloride" object-sequence="2" predicate="nn" subject="deposition" subject-sequence="4"/>
          <node object="salt" object-sequence="3" predicate="nn" subject="deposition" subject-sequence="4"/>
        </node>
      </node>
    </node>
  </node>
</node>
```

```xml

<line><![CDATA[Ammonium_chloride_salt_deposition is most likely to occur in heat_exchangers where the_process_stream is cooled below the_NH4Cl_salt_deposition_temperature.]]></line>
<node object="Ammonium_chloride_salt_deposition" object-sequence="4"/>
<node object="Ammonium_chloride_salt_deposition" object-sequence="1" predicate="nsubj" subject="likely" subject-sequence="4"/>
<node object="Ammonium_chloride_salt_deposition" object-sequence="1" predicate="xsubj" subject="occur" subject-sequence="6"/>
<node object="is" object-sequence="2" predicate="cop" subject="likely" subject-sequence="4"/>
<node object="most" object-sequence="3" predicate="advmod" subject="likely" subject-sequence="4"/>
<node object="likely" object-sequence="4" predicate="root" subject="ROOT" subject-sequence="0"/>
<node object="to" object-sequence="5" predicate="aux" subject="occur" subject-sequence="6"/>
<node object="occur" object-sequence="6" predicate="xcomp" subject="likely" subject-sequence="4"/>
<node object="heat_exchangers" object-sequence="8" predicate="prep_in" subject="occur" subject-sequence="6"/>
<node object="where" object-sequence="9" predicate="advmod" subject="cooled" subject-sequence="12"/>
<node object="the_process_stream" object-sequence="10" predicate="nsubjpass" subject="cooled" subject-sequence="12"/>
<node object="is" object-sequence="11" predicate="auxpass" subject="cooled" subject-sequence="12"/>
<node object="cooled" object-sequence="12" predicate="advcl" subject="occur" subject-sequence="6"/>
<node object="the_NH4Cl_salt_deposition_temperature" object-sequence="14" predicate="prep_below" subject="cooled" subject-sequence="12"/>

```

CONFIDENCE WEIGHTING OF COMPLEX RELATIONSHIPS IN UNSTRUCTURED DATA

TECHNICAL FIELD

The present invention relates generally to a method, system, and computer program product for machine understanding of textual data. More particularly, the present invention relates to a method, system, and computer program product for confidence weighting of complex relationships in unstructured data.

BACKGROUND

Structured data is data that conforms to an organization defined by a specification. In a data fragment of a structured data, the content of the data fragment has meaning or significance not only from the literal interpretation of the content of the fragment, but also from the form, location, and other organization-specific attributes of the fragment.

In contrast, unstructured data is data that does not conform to any particular organization, and position or form of the content in a data fragment of unstructured data generally does not contribute to the meaning or significance of the content. A newspaper article, a whitepaper document, notes taken by a researcher, or generally human readable textual data in a variety of forms are some examples of unstructured data.

Natural language processing (NLP) is a technique that facilitates exchange of information between humans and data processing systems. For example, one branch of NLP pertains to transforming human readable content, such as unstructured data, into machine usable data. For example, NLP engines are presently usable to accept input content such as a newspaper article or a whitepaper, and produce structured data, such as an outline of the input content, most significant and least significant parts, a subject, a reference, dependencies within the content, and the like, from the given content.

Another branch of NLP pertains to answering questions about a subject matter based on information available about the subject matter domain. Information about a domain can take many forms, including but not limited to knowledge repositories and ontologies created from machine usable data created from unstructured data in the first branch of NLP.

A corpus (plural: corpora) is data, or a collection of data, used in linguistics and language processing. A corpus generally comprises large volume of data, usually text, stored electronically.

Presently, systems and methods are available to parse unstructured data into a structured form. Presently available systems, such as information extraction systems, are adept at extracting and classifying noun entities, such as people, cities, genes, proteins etc., from a given corpus of unstructured data. Presently available methods can also establish simple semantic relationships between the extracted entities. For example, presently available methods can relate that an extracted person entity 'lives in' an extracted city entity, one extracted gene entity 'inhibits' another extracted gene entity, and so on.

Presently available systems and methods for information extraction construct "triples" of extracted information. A triple is an [ENTITY <VERB> ENTITY] construct, where one of the entities is a subject specified in the given corpus, and the subject entity performs, or is predicated upon, an act (verb) specified in the corpus on an object entity specified in the given corpus. For example, given suitable corpus, a presently available system or method can create a triple such as [Obama <president of> US].

Presently, the extracted triple artifacts can be stored, indexed, and made available for semantic processing of data and document retrieval. Existing frameworks such as Resource description Framework (RDF) and Web Ontology Language (OWL) are some examples of presently available methods for extracting such triples.

SUMMARY

The illustrative embodiments provide a method, system, and computer program product for confidence weighting of complex relationships in unstructured data. An embodiment includes a method for confidence weighting relationships between complex entities in unstructured data. The embodiment extracts, from a knowledge graph corresponding to the unstructured data wherein the knowledge graph comprises a set of tokens, an expressed relationship between a subset of the set of tokens, wherein tokens in the subset of tokens are related in the expressed relationship by a set of predicates. The embodiment determines, in the unstructured data, a number of occurrences of the set of predicates. The embodiment determines, in the unstructured data, a number of occurrences of the expressed relationship. The embodiment computes, using a processor and a memory, and using the number of occurrences of the set of predicates and the number of occurrences of the expressed relationship, a confidence value. The embodiment assigns the confidence value to the expressed relationship.

Another embodiment includes a computer program product for confidence weighting relationships between complex entities in unstructured data.

Another embodiment includes a computer system for confidence weighting relationships between complex entities in unstructured data.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

FIG. 4 depicts an example code corresponding to a parse tree, which is usable to generate complex tokens in accordance with an illustrative embodiment;

FIG. 6 depicts an example code corresponding to a knowledge graph in accordance with an illustrative embodiment;

DETAILED DESCRIPTION

Figure 1:
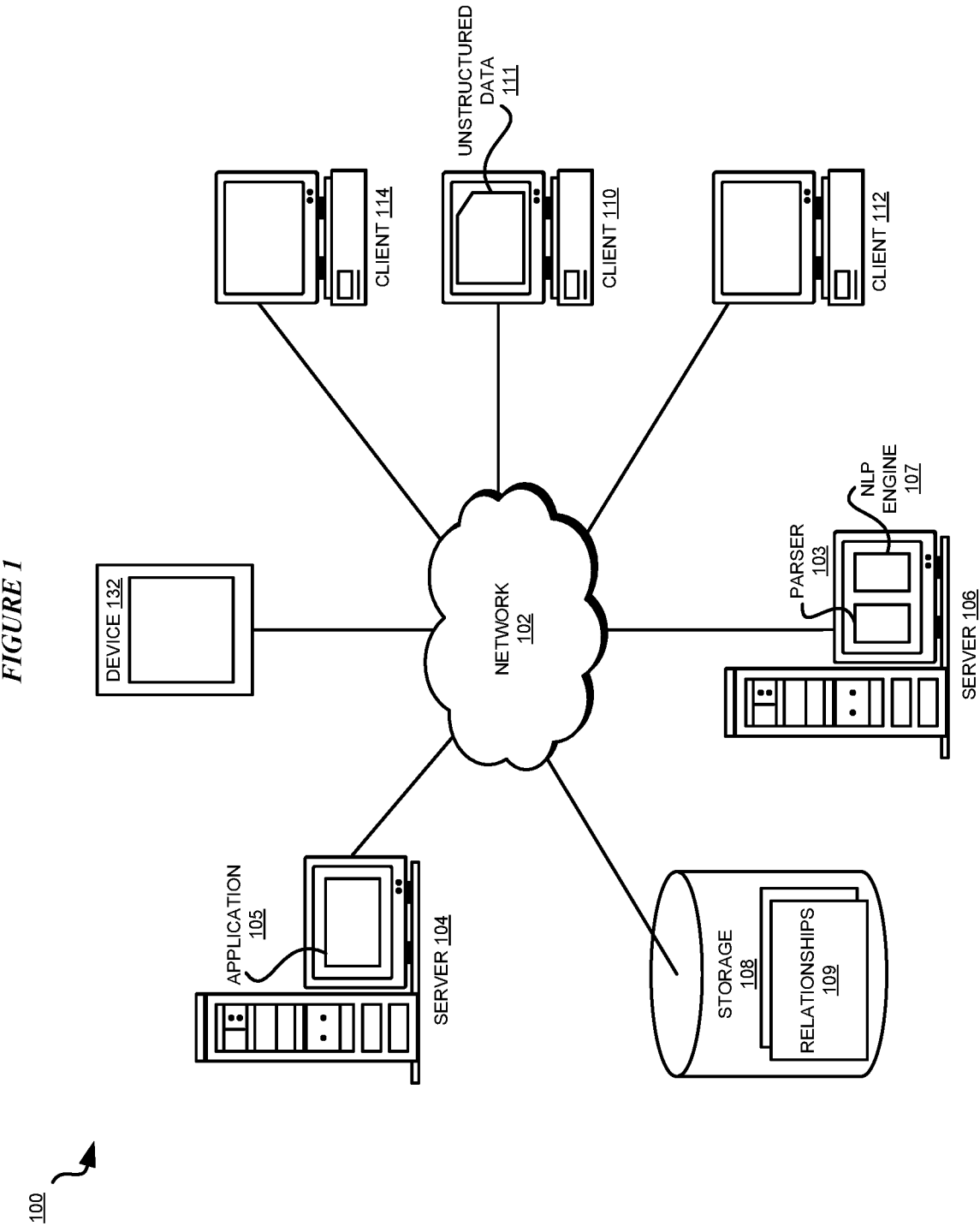
FIG. 1 depicts a block diagram of a network of data processing systems in which illustrative embodiments may be implemented.

Knowledge extraction is a process of creating, providing, or applying logical conclusions based upon the facts and other recitations in given data. For example, suppose that an example unstructured data from the chemical processes domain recites, "Ammonium chloride salt deposition is most likely to occur in heat exchangers where the process stream is cooled below the NH4Cl salt deposition temperature." From this data, knowledge extraction should produce information that can be applied in troubleshooting or otherwise informing another process in the related domain.

The illustrative embodiments recognize that presently, the art of knowledge extraction from unstructured data is in its infancy. Present knowledge extraction techniques are limited to understanding simple grammatical or semantic constructs. One reason for this limitation is that parsing unstructured data using presently available methods yields only simple triples, which are limited to relating noun entities by verb predicates.

The illustrative embodiments recognize that more complex conclusions or knowledge is not presently extractable from unstructured data at least because more complex entities and their relationships, which are hidden in the unstructured data, are not discoverable by the presently available techniques. For example, from the example sentence about a chemical process provided above, presently available knowledge extraction methods can determine that [a salt <deposits in> an exchanger], but they cannot conclude that [Ammonium chloride salt deposition <has something to do with> NH4Cl salt deposition temperature {when heat exchangers are involved}]. The former is a conclusion reached with the help of simple triples, whereas the latter requires a more complex understanding of the entities at play in the sentence, and their inter-relationships.

The illustrative embodiments used to describe the invention generally address and solve the above-described problems and other problems related to knowledge extraction from unstructured data. The illustrative embodiments provide a method, system, and computer program product for extracting complex entities and relationships from unstructured data.

An embodiment uses an existing parser, such as a parser of a presently available NLP engine, to parse given unstructured data. By performing a word-by-word parse operation according to a language model, the parser produces a parse tree, which is usable to identify simple noun entities and triples based thereon.

From the parse tree, an embodiment identifies tokens. A token is a set of words that are related to one another, the words in the set appear together in the unstructured data, and by appearing together refer to a concept that is identified, defined, or used in the unstructured data. For example, in the sentence about the chemical process used in an example above, the parse tree can determine that ammonium is related to deposition, chloride is related to deposition, and salt is related to deposition. From this information in the parse tree, and some combination of the domain knowledge of chemical processes in a suitable knowledge base, the contents of the unstructured data that is being parsed, and the result of other parses of related unstructured data, an embodiment determines that "ammonium chloride salt deposition" is a token.

An embodiment constructs a token such that the entire token can be recognized as a single construct in the language model. Once a set of tokens have been identified, an embodiment inserts the set of tokens into the language model used by the parser. The process of enhancing the language model by inserting the tokens is also referred to herein as "re-insertion" or other variations of the word "re-insertion".

Using the enhanced language model with the re-inserted tokens, an embodiment parses the unstructured data again using the existing parser. The parser produces a new parse tree, called a knowledge graph. The knowledge graph is significantly less complex than the first parse tree, and relates more complex entities, to wit, the tokens, with one another. Consider, for example, parsing the example sentence about the chemical process in this manner. Where the first parse tree would show that the "ammonium" entity is a noun that is predicated on the "deposition" verb, and so on, the knowledge graph shows that token "heat exchangers" is related to token "ammonium chloride salt deposition" through a set of predicates of different types.

An embodiment collapses a branch of the knowledge graph into a relationship expression. The collapsing process transforms the edges into a set of predicates between two token entities in the knowledge graph. For example, the branch that shows that token "heat exchangers" is related to token "ammonium chloride salt deposition" through a set of predicates of different types collapses into [heat_exchangers <prep_in, aux> ammonium_chloride_salt_deposition] form. One example interpretation made possible in an existing knowledge extraction process by such a relationship according to an embodiment is that the ammonium_chloride_salt_ deposition is related to a heat exchanger through a combination of predicates in a chemical process.

Furthermore, the knowledge graph may not have edges connecting two tokens with each other. For example, consider that the heat_exchangers token is related with the ammonium_chloride_salt_deposition token in one branch of the knowledge graph, and with "the_NH4Cl_salt_ deposition_temperature" token in another branch of the knowledge graph. But there may not be any branches in the knowledge graph that go from the ammonium_chloride_salt_deposition token to the_NH4Cl_salt_deposition_temperature token, or in the other direction. An embodiment, concludes from the two branches that even though there are no branches that go from the ammonium_chloride_salt_deposition token to the_NH4Cl_salt_deposition_temperature token, or in the other direction, the ammonium_chloride_salt_deposition token is related to the_NH4Cl_salt_deposition_temperature token under the influence of, or under the condition of, the heat_exchangers token. One example interpretation made possible in an existing knowledge extraction process by such a relationship according to an embodiment is that the ammonium_chloride_salt_deposition is related to the_NH4Cl_salt_deposition_temperature when a heat_exchanger is somehow involved in a chemical process.

A method of an embodiment described herein, when implemented to execute on a device or data processing system, comprises substantial advancement of the functionality of that device or data processing system in knowledge extraction from unstructured data. For example, where prior-art is limited to using simple [noun-verb-noun] triples for knowledge extraction, an embodiment provides a more complex [token-set of predicates-token, condition] to the knowledge extraction process. Operating in a manner described herein, an embodiment significantly improves the quality and quantity of machine usable information that can be extracted from unstructured data. Such manner of extracting complex entities and relationships from unstructured data is unavailable in presently available devices or data processing systems. Thus, a substantial advancement of such devices or data processing systems by executing a method of an embodiment improves machine understanding of unstructured data.

The illustrative embodiments are described with respect to certain methods or techniques, tools, domains, unstructured data, parsing, trees and graphs, relationship expressions, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
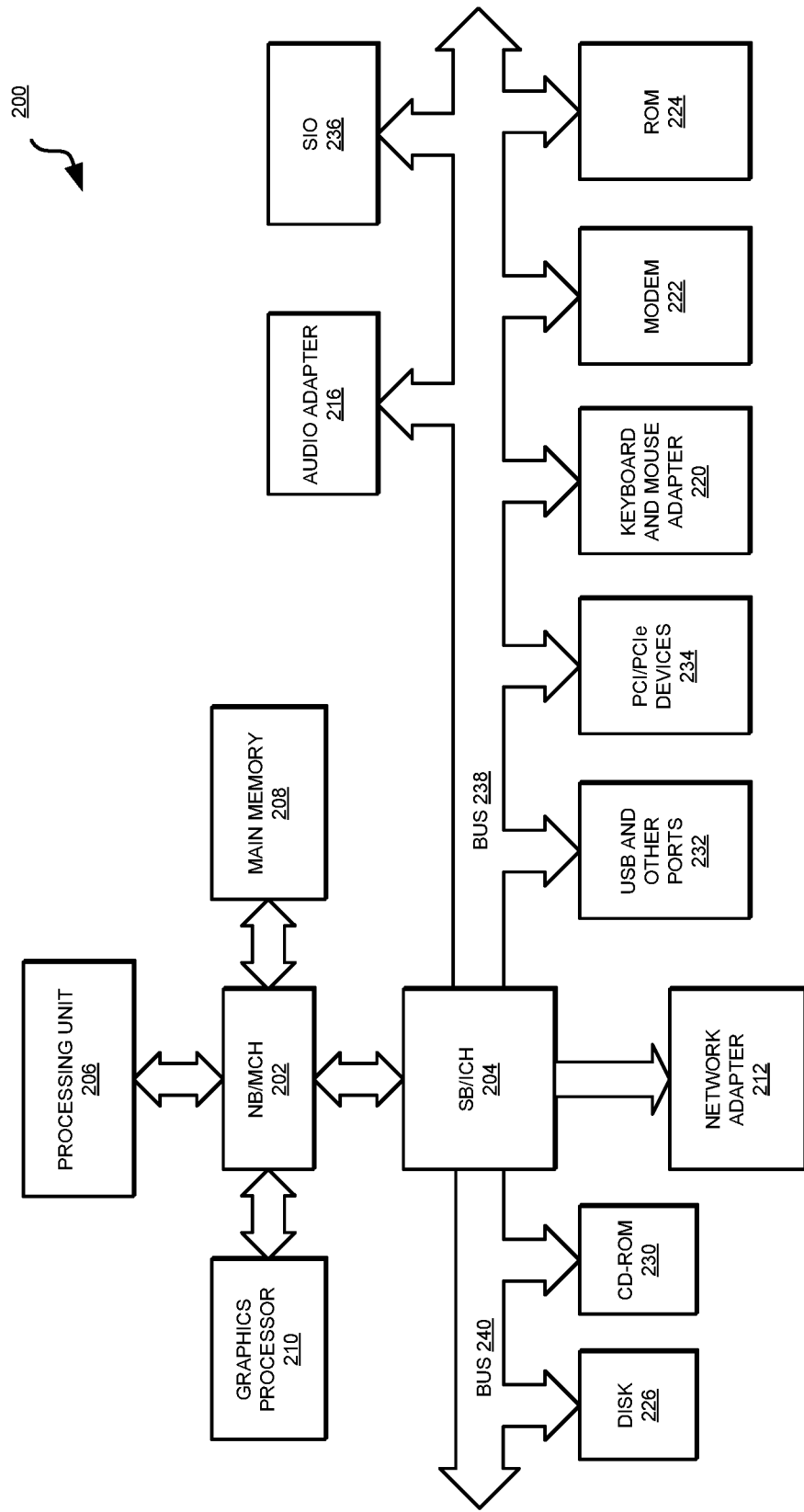
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be Implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device that can be configured for communicating over an overlay. Any software application described as executing in another data processing system in FIG. 1 can be configured to execute in device 132 in a similar manner. Any data or information stored or produced in another data processing system in FIG. 1 can be configured to be stored or produced in device 132 in a similar manner. Parser 103 is an existing parser tool. For example, in an existing knowledge extraction process, parser 103 is configured to operate with NLP engine 107 to extract machine usable information from unstructured data 111. Application 105 operates in conjunction with parser 103 and NLP engine 107 to produce relationships 109. Relationships 109 improve the existing knowledge extraction process in a manner described herein.

Servers 104 and 106, storage unit 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system such as AIX® (AIX is a trademark of International Business Machines Corporation in the United States and other countries), Microsoft® Windows® (Microsoft and Windows are trademarks of Microsoft Corporation in the United States and other countries), Linux® (Linux is a trademark of Linus Torvalds in the United States and other countries), iOS™ (iOS is a trademark of Cisco Systems, Inc. licensed to Apple Inc. in the United States and in other countries), or Android™ (Android is a trademark of Google Inc., in the United States and in other countries). An object oriented programming system, such as the Java™ programming system, may run in conjunction with the operating system and provide calls to the operating system from Java™ programs or applications executing on data processing system 200 (Java and all Java-based trademarks and logos are trademarks or registered trademarks of Oracle Corporation and/or its affiliates).

Instructions for the operating system, the object-oriented programming system, and applications or programs, such as application 105 in FIG. 1, are located on storage devices, such as hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Figure 3:
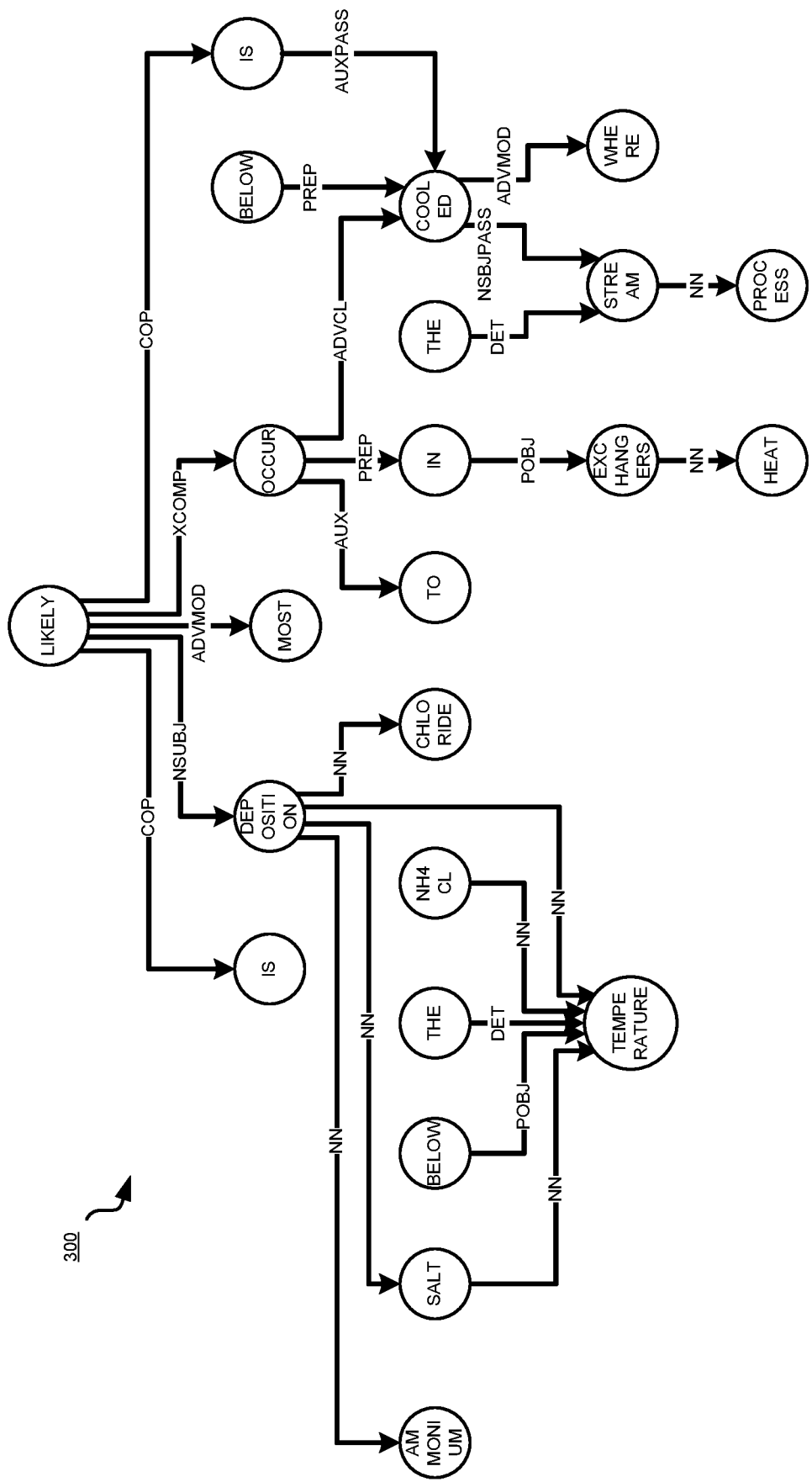
FIG. 3 depicts an example parse tree that is usable to generate complex tokens in accordance with an illustrative embodiment.

With reference to FIG. 3, this figure depicts an example parse tree that is usable to generate complex tokens in accordance with an illustrative embodiment. Assume that unstructured data 111 in FIG. 1 includes the example sentence pertaining to the chemical process provided in an earlier example herein. Parser 103 in FIG. 1 uses an existing language model and parses the sentence in unstructured data 111 to produce parse tree 300.

As can be seen, parse tree 300 includes entities that are single words. Those single word entities in parse tree 300 are related to other single word entities in parse tree 300 by a variety of predicates. The types of predicates relating the word entities as shown are well known to those of ordinary skill in the art.

With reference to FIG. 4, this figure depicts an example code corresponding to a parse tree, which is usable to generate complex tokens in accordance with an illustrative embodiment. Code 400 corresponds to parse tree 300 in FIG. 3. Parser 103 in FIG. 1 uses an existing language model and parses the sentence in unstructured data 111 to produce code 400 for parse tree 300. In one embodiment, code 400 comprises eXtensible Markup Language (XML) code.

As is evident, code 400 and parse tree 300 both merely show relationships between individual words in the example sentence. Neither code 400 nor parse tree 300 has been able to extract any complex entities or relationships therebetween that are representative of a subject-matter-specific concept represented in the example sentence.

Figure 5:
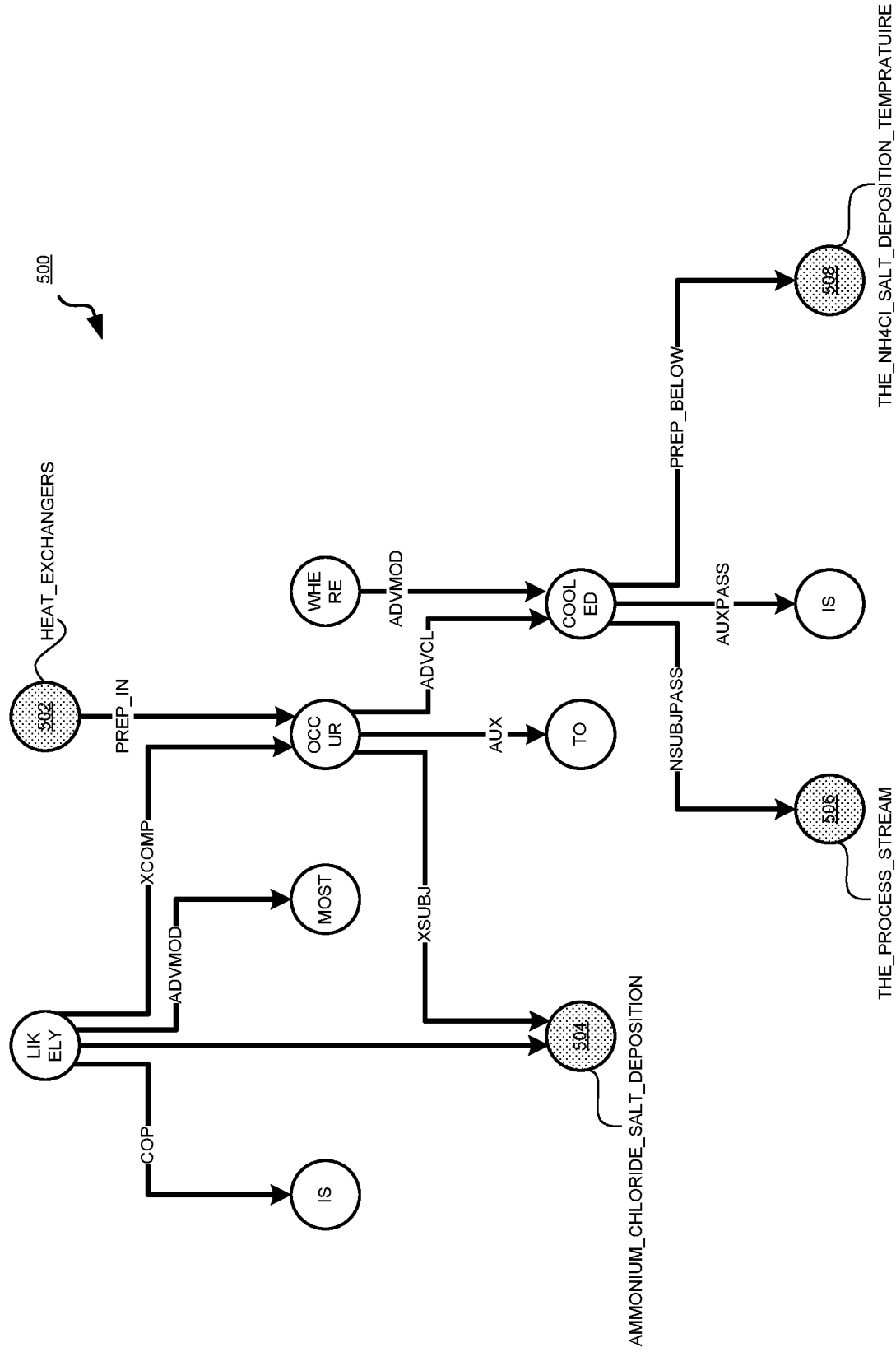
FIG. 5 depicts an example knowledge tree in accordance with an illustrative embodiment.

With reference to FIG. 5, this figure depicts an example knowledge tree in accordance with an illustrative embodiment. Parser 103 in FIG. 1 uses an enhanced language model and parses the sentence in unstructured data 111 to produce knowledge graph 500.

An embodiment, such as an embodiment implemented in application 105 in FIG. 1 creates example tokens 502, 504, 506, and 508. To identify and create tokens 502-508, the application uses the information from parse tree 300 in FIG. 3 or code 400 in FIG. 4, in combination with one or more of the domain knowledge of chemical processes in a suitable knowledgebase, the contents of the unstructured data that is being parsed, and the result of other parses of related unstructured data.

For example, using these sources, the application determines that while "ammonium", "chloride", "salt", and "deposition" are separate words in parse tree 300, "ammonium chloride" is a token representing a chemical compound—a concept in the context of a chemical process. Similarly, the application determines that "salt deposition" is also a token representing a chemical process—another concept in the context of the subject matter of the unstructured data.

Furthermore, the application determines that "ammonium chloride" is a salt in the subject matter domain of the unstructured data. Therefore, the application determines that "ammonium chloride salt" and "salt deposition" are relevant concepts in the domain of chemical processes that are present in the unstructured data. Therefore, the application determines that "ammonium chloride salt deposition" is a complex token that is meaningful within the context of the unstructured data. Thus, the application constructs token 504. The application also constructs tokens 502, 506, and 508 through a similar process.

The application re-inserts tokens 502-508 into the language model to enhance the language model. The application then causes parser 103 to re-parse the unstructured data using the enhanced language model to produce knowledge graph 500.

The parser regards the inserted tokens as semantic structures to be recognized together. For example, in one embodiment, the parser regards an inserted token as a word. Entities in knowledge graph 500 include single word entities as well as tokens. Generally, a knowledge graph according to an embodiment can include any combination of tokens of various lengths and single word entities.

As can be seen, knowledge graph 500 is sparser than parse tree 300 as a result of including tokens 502-508. Entities, including tokens, in knowledge graph 500 are related to entities by a variety of predicates. The types of predicates relating the word entities as shown are well known to those of ordinary skill in the art.

With reference to FIG. 6, this figure depicts an example code corresponding to a knowledge graph in accordance with an illustrative embodiment. Code 600 corresponds to knowledge graph 500 in FIG. 5. Parser 103 in FIG. 1 uses an enhanced language model and parses the example sentence in unstructured data 111 to produce code 600 for knowledge graph 500. In one embodiment, code 600 comprises XML code.

As compared to code 400 in FIG. 4, code 600 significantly more compact, yet significantly more informative owing to the injection of the tokens into the language model. The entities and the relationships therebetween that can be extracted and/or inferred from knowledge graph 500 corresponding to code 600 are also, consequently, far more complex as compared to those from parse tree 300 corresponding to code 400.

Figure 7:
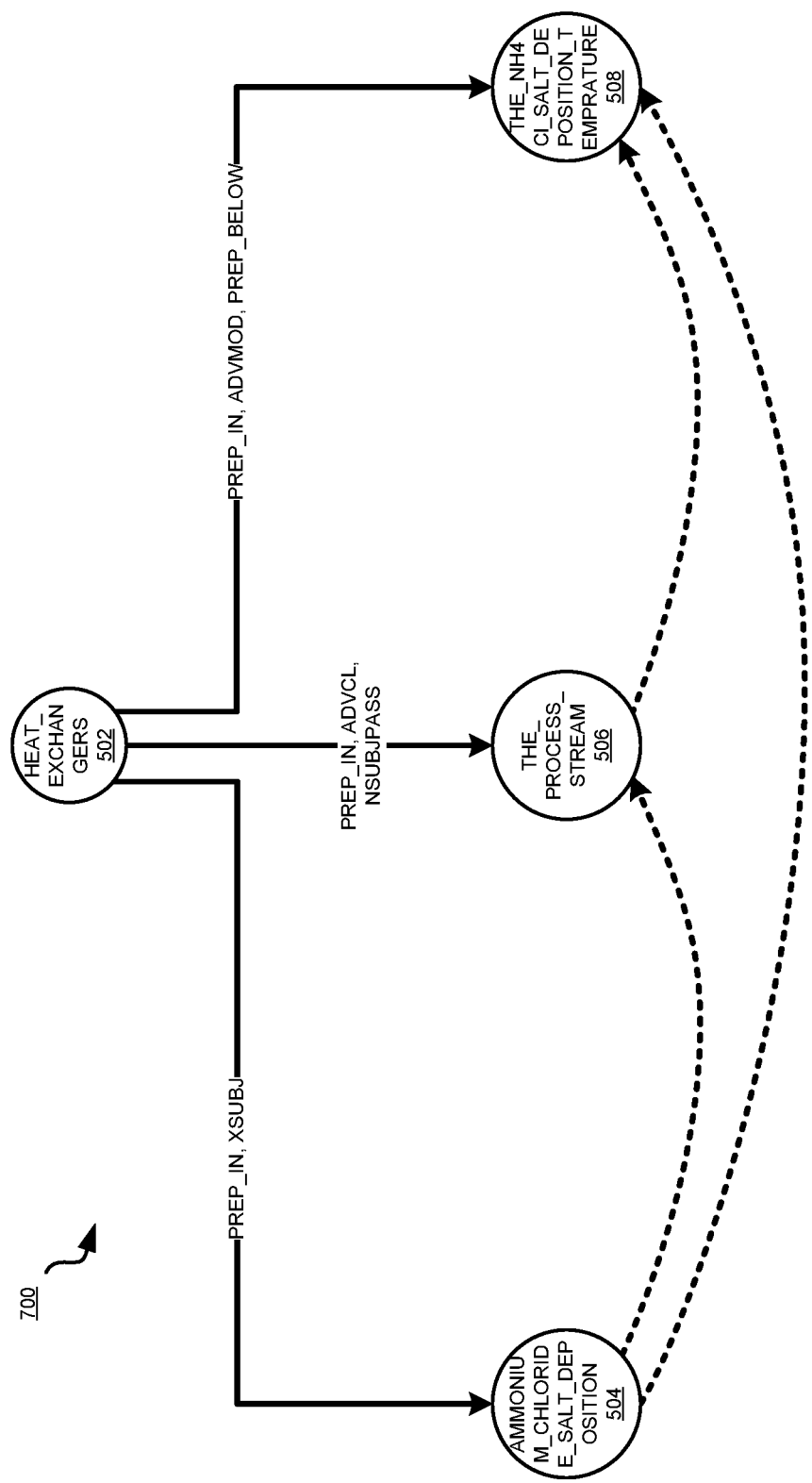
FIG. 7 depicts a collapsed knowledge graph in accordance with an illustrative embodiment.

With reference to FIG. 7, this figure depicts a collapsed knowledge graph in accordance with an illustrative embodiment. Collapsed knowledge graph 700 is a collapsed view of a portion of knowledge graph 500 in FIG. 5. Tokens 502, 504, 506, and 508 are the same tokens as depicted in FIG. 5. An embodiment implemented in application 105 in FIG. 1 collapses all or a part of a knowledge graph into a collapsed form in this manner.

In the collapsed form, knowledge graph 700 shows the relationships expressed therein with non-limiting example solid edges between tokens 502, 504, 506, and 508. Particularly, an edge, e.g., represented by a solid line in this example depiction, means that one or more edges trace a branch in knowledge graph 500 from one token to another token.

For example, the edge from token 502 (heat_exchangers) to token 504 (ammonium_chloride_salt_deposition) results from a set of edges in knowledge graph 500, the set of edges including an edge from token 502 (heat_exchangers) to entity "occur" and having a predicate "prep_in", and an edge from entity "occur" to token 504 (ammonium_chloride_salt_deposition) and having a predicate "xsubj". Accordingly, in collapsed knowledge graph 700, the edge from token 502 (heat_exchangers) to token 504 (ammonium_chloride_salt_deposition) has a set of predicates associated therewith, the set of predicates including "prep_in" and "xsubj". In other words, this edge in collapsed knowledge graph 700 informs that token heat_exchangers is related to token ammonium_chloride_salt_deposition by predicates (prep_in and xsubj). This relationship can be expressed as—

[heat_exchangers (prep_in and xsubj) ammonium_chloride_salt_deposition].

Similarly, in collapsed knowledge graph 700, the edge from token 502 (heat_exchangers) to token 506 (the_process_stream) is related by a different set of predicates that includes "prep_in", "advcl", and "nsubjpass" by virtue of the multi-edge branch in knowledge graph 500 that traverses from token 502 to token 506. This relationship can be expressed as—

[heat_exchangers (prep_in, advcl, nsubjpass) the_process_stream].

Similarly, in collapsed knowledge graph 700, the edge from token 502 (heat_exchangers) to token 508 (the_NH4Cl_salt_deposition_temperature) is related by yet another set of predicates that includes "prep_in", "advcl", and "prep_below" by virtue of the multi-edge branch in knowledge graph 500 that traverses from token 502 to token 508. This relationship can be expressed as—

[heat_exchangers (prep_in, advcl, prep_below) the_NH4Cl_salt_deposition_temperature].

In the collapsed form, knowledge graph 700 shows the relationships inferred therefrom with non-limiting example dotted edges between tokens 504, 506, and 508. Particularly, an edge, e.g., represented by a dotted line in this example depiction, means that even though no edges trace a branch in knowledge graph 500 from one token to another token, a relationship can be implied between two participating tokens.

As a non-limiting example, the edge from token 504 (ammonium_chloride_salt_deposition) to token 506 (the_process_stream) can be inferred because knowledge tree 500 has branches that connect to tokens 504 and 506 from a common token, to wit, from token 502. In other words, this inferred edge in collapsed knowledge graph 700 informs that token 502 (heat_exchangers) influences or conditions the relationship between token ammonium_chloride_salt_deposition and token the_process_stream. A set of predicates for this inferred relationship is some combination of set of predicates (prep_in and xsubj) and set of predicates (prep_in, advcl, nsubjpass). This relationship can be expressed as—

[ammonium_chloride_salt_deposition (prep_in, xsubj, advcl, nsubjpass) the_process_stream {heat_exchangers}].

Similarly, in collapsed knowledge graph 700, the inferred edge from token 506 (the_process_stream) to token 508 (the_NH4Cl_salt_deposition_temperature) is influenced or conditioned by token 502 (heat_exchangers), and has a combination of predicates from set ("prep_in", "advcl", "nsubjpass") and set ("prep_in", "advcl", "prep_below"). This relationship can be expressed as—

[the_process_stream (prep_in, advcl, nsubjpass, prep_below) the_NH4Cl_salt_deposition_temperature {heat_exchangers}].

Similarly, in collapsed knowledge graph 700, the inferred edge from token 504 (ammonium_chloride_salt_deposition) to token 508 (the_NH4Cl_salt_deposition_temperature) is influenced or conditioned by token 502 (heat_exchangers), and has a combination of predicates from set ("prep_in", "advcl") and set ("prep_in", "advcl", "prep_below"). This relationship can be expressed as—

[ammonium_chloride_salt_deposition (prep_in, xsubj, advcl, prep_below) the_NH4Cl_salt_deposition_temperature {heat_exchangers}].

Other relationships can be similarly inferred from collapsed knowledge graph 700. For example, there can be an inferred relationship from token 508 to token 504 (not shown), from token 508 to token 506 (not shown), and from token 506 to token 504 (not shown). The simplified example using a single sentence parse already demonstrates the types and numbers of complex tokens and their relationships that can be extracted from unstructured data according to an embodiment. A web-sized corpus of unstructured data can contain thousand or even millions of unstructured documents with hundreds or thousands of unstructured sentences in each document. It is easy to see the significant improvement afforded by one or more embodiments described herein in the knowledge extraction from unstructured data, as compared to the prior art.

Figure 8:
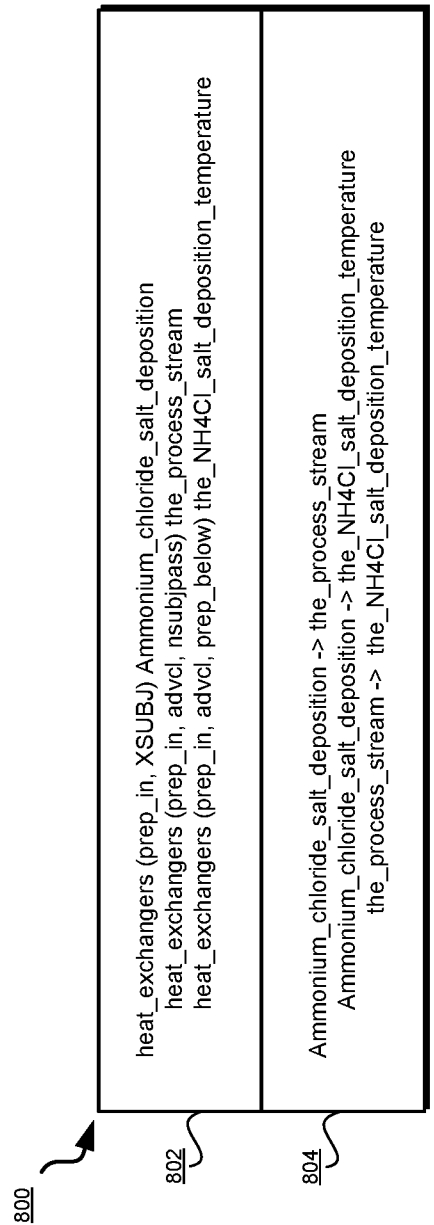
FIG. 8 depicts some example of expressed and inferred relationships in a collapsed knowledge graph in accordance with an illustrative embodiment.

With reference to FIG. 8, this figure depicts some example of expressed and inferred relationships in a collapsed knowledge graph in accordance with an illustrative embodiment. Relationships 800 are expressed or inferred from example collapsed knowledge graph 700 in FIG. 7.

Block 802 shows an example representation of the relationships that are expressed, e.g., by edges represented by solid lines, in collapsed knowledge graph 700. These relationships are described with respect to FIG. 7.

Block 804 shows an example representation of the relationships that are inferred, e.g., by edges represented by dotted lines, in collapsed knowledge graph 700. These relationships are described with respect to FIG. 7 in a different form than the form represented in block 804. These examples of representations of expressed or inferred relationships, or the example manners of representing them in a collapsed knowledge graph are not intended to be limiting. From this disclosure, those of ordinary skill in the art will be able to conceive many other representations for similar purposes and the same are contemplated within the scope of the illustrative embodiments.

Figure 9:
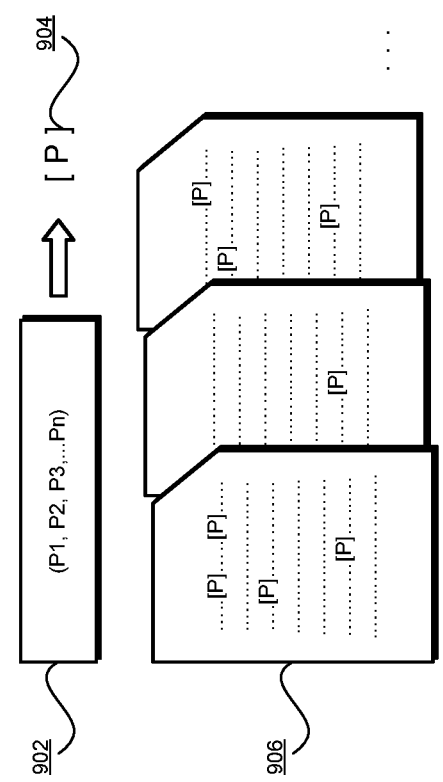
FIG. 9 depicts a block diagram of a relationship aspect used in confidence weighting of complex relationships in unstructured data in accordance with the illustrative embodiments.

With reference to FIG. 9, this figure depicts a block diagram of a relationship aspect used in confidence weighting of complex relationships in unstructured data in accordance with the illustrative embodiments. Set of predicates 902 is a normalized example of the set of predicates shown in a relationship in block 802 of FIG. 8.

Notice that a relationship in block 802 of FIG. 8 relates complex entities by a set of predicates. For example, expressed relationship [heat_exchangers (prep_in and xsubj) ammonium_chloride_salt_deposition] relates token heat_exchangers with token ammonium_chloride_salt_deposition using a set of two predicates—prep_in and xsubj.

An embodiment regards the entire set of predicates, which relates two complex entities in such a relationship, as a single complex predicate. In other words, treating the entire set of predicates as a single complex predicate indicates that not only are the individual predicates that occur in a relationship important, but the combination in which they occur in the relationship has significance in the relationship as well.

Complex predicate 904 is a normalized representation of a complex predicate in an expressed relationship. Complex predicate 904 can have any number of individual predicates in corresponding set of predicates 902.

An embodiment computes a weight or a confidence value of an expressed relationship using a Predicate Frequency-Inverse Sentence Frequency (PF-ISF) algorithm described herein.

The first step in this algorithm according to an embodiment is to build the Predicate Frequency metric for a complex predicate. The PF metric indicates how often the complex predicate occurs in the given unstructured data. Recall that the given unstructured data can be a corpus of any number of unstructured documents of any size. The embodiment does not consider the entities that are related by the complex predicate in any particular occurrence, just that some entities are related using that complex predicate in the corpus.

In other words, the algorithm just looks for absolute occurrences of the given complex predicate, as shown in searched corpus 906. In a similar manner, the algorithm finds the number of occurrences of any number of distinct complex predicates.

As an illustrative example, suppose that in a particular example corpus of unstructured data that includes the unstructured sentence example used in this disclosure, the algorithm finds five thousand occurrences of the first complex predicate in the first relationship in block 802, two hundred occurrences of the second complex predicate in the second relationship in block 802, and twelve hundred fifty occurrences of the third complex predicate in the third relationship in block 802. The algorithm computes a PF metric for each complex predicate as follows—

PF (P)=log 10 (number of occurrences), where P is complex predicate 904.

In the example of the relationships of block 802, the algorithm computes the PF metric for each complex predicate as—

PF(prep_in, xsubj)=log 10(5000)
PF(prep_in, advcl, nsubjpass)=log 10(200)
PF(prep_in, advcl, prep_below)=log 10(1250)

By computing the PF metric for a complex predicate, the algorithm seeks to determine the following—if the complex predicate occurs frequently, the complex predicate is likely to be a common way of expressing a relationship in the corpus, and therefore the confidence in the relationship can be at or above a threshold confidence value. If the complex predicate only occurs rarely, then the chances of the relationship being a valid relationship are not high, and the confidence value of that relationship should be below the threshold confidence value. Any number of confidence value thresholds can be used to crate different degrees of confidence in the various relationships.

Another embodiment recognizes that the PF metric cannot be relied upon as the sole metric for computing a confidence value of a relationship. To illustrate the reason for this, consider, for example, that a corpus has one document with 500 pages that has a unique style of expressing the ideas therein, and 500 documents with one page each and having a variety of styles of expressing the ideas therein. If PF metric is used as the only basis for confidence in a relationship, the PF metric will not represent the "spread" of the complex predicate across the entire corpus. The PF metric will be skewed by those documents that are larger, or have more unique styles, or some combination thereof.

The PF metric value of a complex predicate can be significantly higher than an ISF value of the complex predicate, described below. The logarithm of the PF value maintains the true ratio of the PF and ISF metrics in relative terms while keeping the two values close together, thereby smoothing the PF-ISF metric distribution of the various complex predicates.

Figure 10:
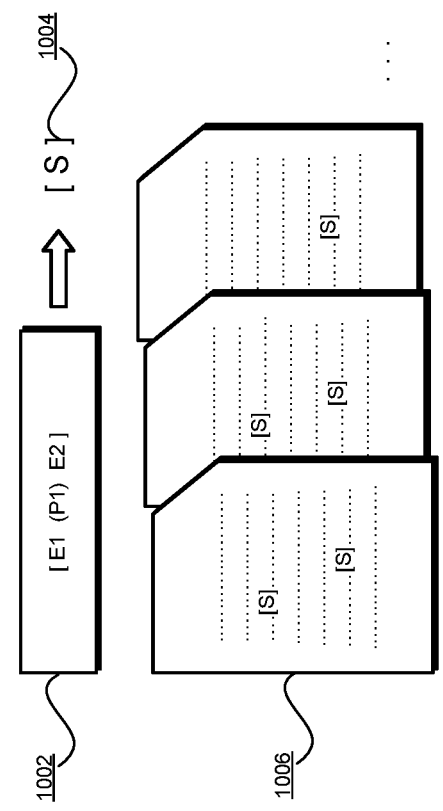
FIG. 10 depicts a block diagram of a relationship aspect used in confidence weighting of complex relationships in unstructured data in accordance with the illustrative embodiments.

With reference to FIG. 10, this figure depicts a block diagram of a relationship aspect used in confidence weighting of complex relationships in unstructured data in accordance with the illustrative embodiments. Relationship 1002 is a normalized example of an expressed relationship in block 802 of FIG. 8.

Sentence S 1004 is a normalized representation of expressed relationship 1002. Any number of different sentences S can exists in a given corpus of unstructured data.

According to an embodiment, the algorithm further determines a sentence frequency. In other words, the algorithm looks for the occurrences of the given sentence, as shown in searched corpus 1006. In a similar manner, the algorithm finds the number of occurrences of any number of distinct sentences. The sentence frequency (SF) of S is a numeric value n—

SF (S)=n, where S is sentence S 1004.

Again using some example number of occurrences of the example expressed relationships of block 802 in an example corpus, the algorithm computes the SF metric for each distinct sentence as—

SF([heat_exchangers (prep_in and xsubj) ammonium_chloride_salt_deposition])=20
SF([heat_exchangers (prep_in, advcl, nsubjpass) the_process_stream])=100
SF([heat_exchangers (prep_in, advcl, prep_below) the_NH4Cl_salt_deposition_temperature])=50

An inverse sentence frequency (ISF) of a sentence is the inverse of the SF of the sentence—

ISF(S)=1/SF(S)

Thus, according to the algorithm, the PF-ISF value of a complex relationship is

PF(P)/SF(S), where P is the complex predicate in sentence S.

According to this computation, the PF-ISF value of the first expressed relationship in block 802 using the example PF and SF values provided above is—

Log 10(5000)/20=3.69/20=0.1845

An embodiment assigns the PF-ISF value of an expressed relationship as the confidence value of that expressed relationship.

Figure 11:
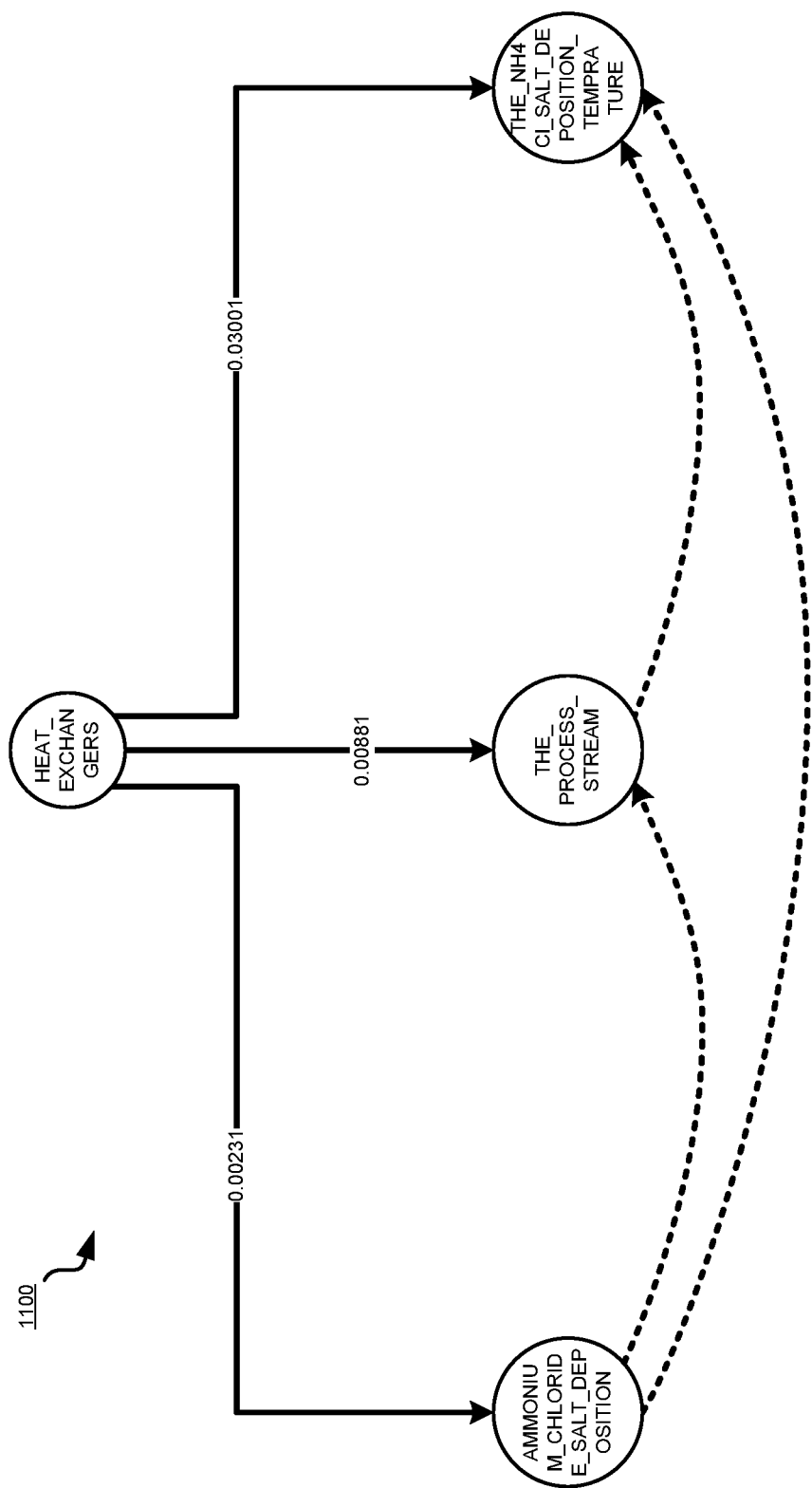
FIG. 11 depicts an example collapsed knowledge graph with confidence values in accordance with an illustrative embodiment.

With reference to FIG. 11, this figure depicts an example collapsed knowledge graph with confidence values in accordance with an illustrative embodiment. Collapsed knowledge graph 1100 is similar to collapsed knowledge graph 700 in FIG. 7. Each expressed relationship in collapsed knowledge graph 1100 is shown to have a confidence value. The example confidence values are the PF-ISF values computed in the manner of FIGS. 9-10 for a given example corpus of unstructured data.

Figure 12:
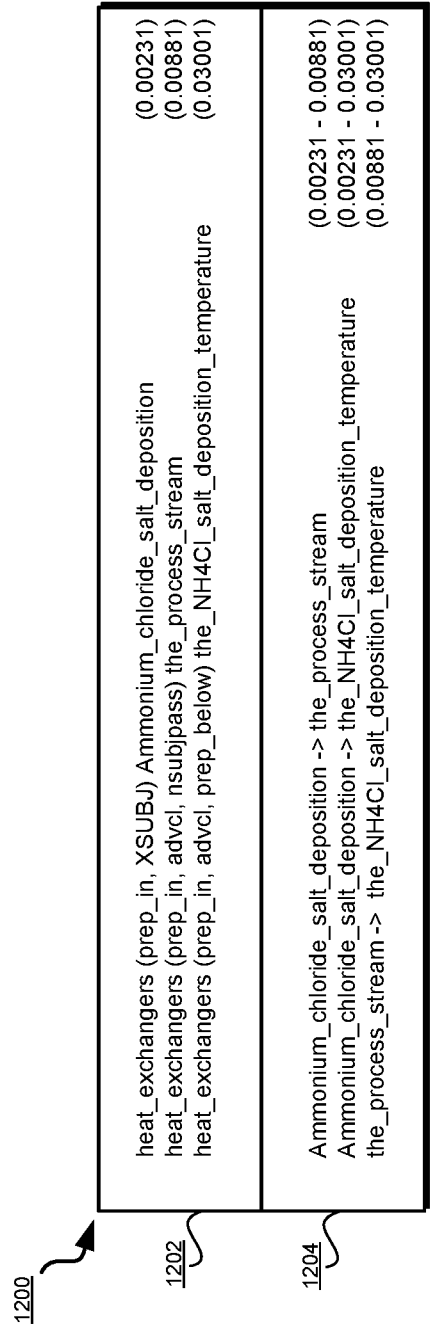
FIG. 12 depicts some example of expressed and inferred relationships with confidence values and ranges in a collapsed knowledge graph in accordance with an illustrative embodiment.

With reference to FIG. 12, this figure depicts some example of expressed and inferred relationships with confidence values and ranges in a collapsed knowledge graph in accordance with an illustrative embodiment.

Relationships 1200 are expressed or inferred from example collapsed knowledge graph 1100 in FIG. 11, in the same manner as relationships 800 are expressed or inferred from example collapsed knowledge graph 700 in FIG. 7.

Block 1202 shows an example representation of the relationships that are expressed, together with their example confidence values as depicted in FIG. 11.

Block 1204 shows an example representation of the relationships that are inferred from the expressed relationships of block 1202. These relationships are described with respect to FIG. 7 in a different form than the form represented in block 1204. These examples of representations of expressed or inferred relationships, or the example manners of representing them in a collapsed knowledge graph are not intended to be limiting. From this disclosure, those of ordinary skill in the art will be able to conceive many other representations for similar purposes and the same are contemplated within the scope of the illustrative embodiments.

An inferred relationship has a confidence value range. The confidence value range of an inferred relationship is based on the confidence values of the subset of expressed relationships that are used to form the inferred relationship. The lowest confidence value associated with any expressed relationship in the subset is the lower bound of the confidence range of the inferred relationship. The highest confidence value associated with any expressed relationship in the subset is the upper bound of the confidence range of the inferred relationship. For example, the inferred relationship [ammonium_chloride_salt_deposition->the_process_stream] in block 1204 depends on the expressed relationships [heat_exchangers (prep_in and xsubj) ammonium_chloride_salt_deposition] with confidence value 0.00231, and [heat_exchangers (prep_in, advcl, nsubjpass) the_process_stream] with confidence value 0.00881. Accordingly, the confidence range of inferred relationship [ammonium_chloride_salt_deposition->the_process_stream] is 0.00231 to 0.00881. Other confidence ranges for other inferred relationships in block 1204 are similarly obtained from the confidence values of the expressed relationships in block 1202.

Figure 13:
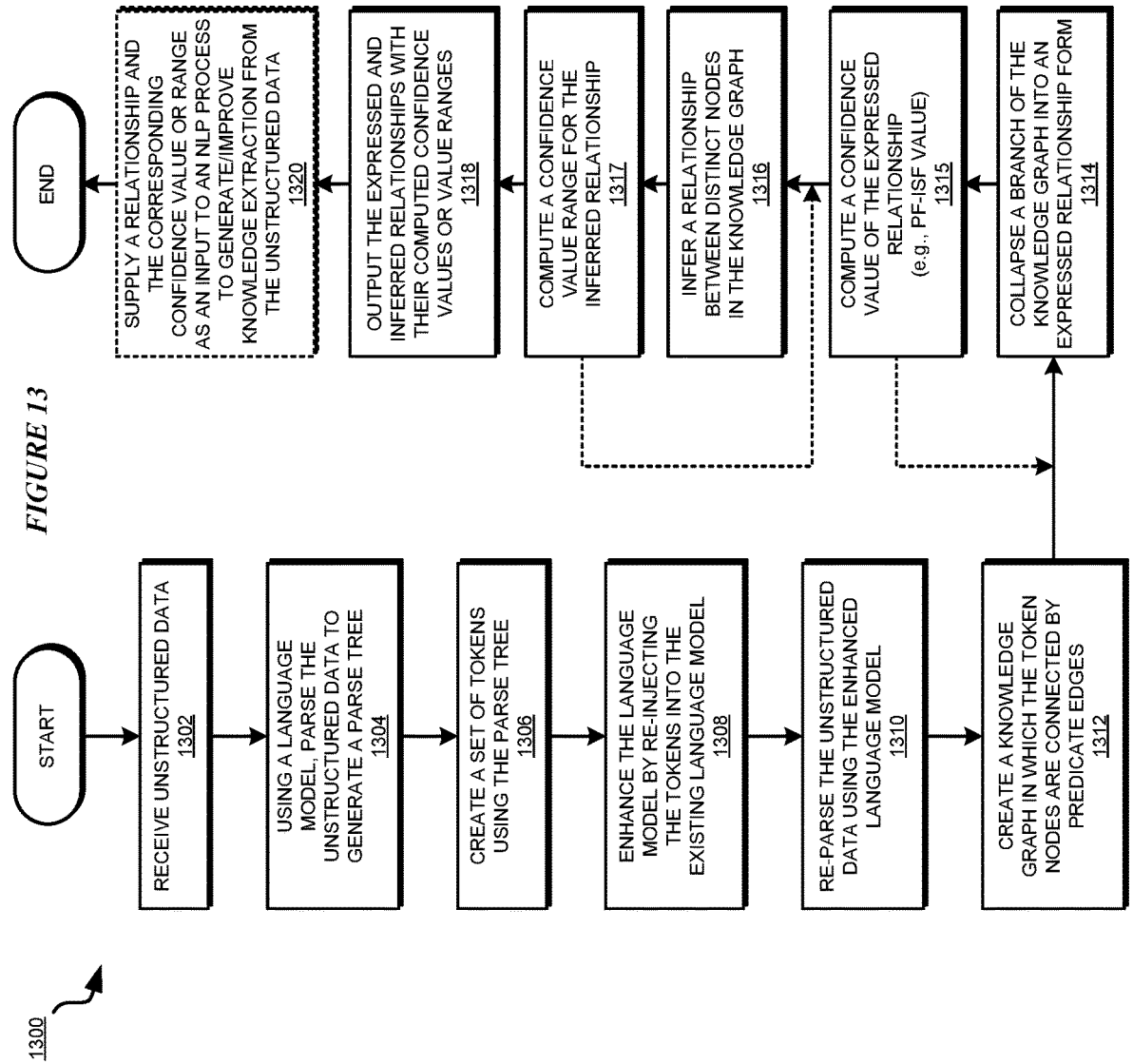
FIG. 13 depicts a flowchart of an example process for extracting complex entities and relationships from unstructured data in accordance with an illustrative embodiment.

With reference to FIG. 13, this figure depicts a flowchart of an example process for extracting complex entities and relationships from unstructured data in accordance with an illustrative embodiment. Process 1300 can be implemented in application 105 in FIG. 1.

The application receives unstructured data (block 1302). The application, using an existing language model and a parser, parses the unstructured data to generate a parse tree (block 1304). The application creates a set of tokens using the parse tree and a combination of any number or types of other sources described herein (block 1306).

The application enhances the existing language model by re-injecting the tokens into the existing language model (block 1308). Note that the existing language model may be a prior art language model, or an enhanced language model from a previous execution of all or parts of process 1300. Those of ordinary skill in the art will appreciate that the re-insertion of tokens and computing the knowledge trees can be iterative, to create increasingly complex tokens, relationships, or both, and the same is contemplated within the scope of the illustrative embodiments.

The application re-parses the unstructured data using the enhanced language model (block 1310). The application creates, generates, computes, or otherwise presents a knowledge graph in which the token nodes are connected by predicate edges (block 1312).

The application collapses a branch of the knowledge graph into a relationship form (block 1314). The application computes a confidence value of the expressed relationship obtained in block 1314 (block 1315). The application repeats the collapsing operation of block 1314 and the confidence value computation of block 1315 as many times as may be needed, depending upon the number of tokens present, number and types of expressed relationships to be identified, or some combination of these and other implementation-specific considerations.

When desired and possible, the application further infers one or more relationships between the distinct token nodes in the collapsed knowledge graph (block 1316). The application computes a confidence range of the inferred relationship obtained in block 1316 (block 1317). The application repeats the inferring operation of block 1316 and the confidence range computation of block 1317 as many times as may be needed, depending upon the number of tokens present, number and types of expressed relationships identified, or some combination of these and other implementation-specific considerations.

The application outputs the expressed relationships with their corresponding confidence values, and the inferred relationships along with their corresponding confidence ranges (block 1318).

One or more of the output relationships are then usable in a knowledge extraction process. For example, in one implementation, the output relationships form an input to an NLP process. The NLP process selects a relationship according to the confidence value or range associated therewith, and used the selected relationship to generate or improve the quality, the quantity, or both, of the machine usable information extracted from unstructured data (optional block 1320). The application ends process 1300 thereafter.

Thus, a computer implemented method, system or apparatus, and computer program product are provided in the illustrative embodiments for confidence weighting of complex relationships in unstructured data. Where an embodiment or a portion thereof is described with respect to a type of device, the computer implemented method, system or apparatus, the computer program product, or a portion thereof, are adapted or configured for use with a suitable and comparable manifestation of that type of device.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for confidence weighting relationships between complex entities in unstructured data, the method comprising:
   extracting, from a knowledge graph corresponding to the unstructured data wherein the knowledge graph comprises a set of tokens, an expressed relationship between a subset of the set of tokens, wherein tokens in the subset of tokens are related in the expressed relationship by a set of predicates;
   determining, in the unstructured data, a number of occurrences of the set of predicates;
   determining, in the unstructured data, a number of occurrences of the expressed relationship;
   computing, using a processor and a memory, and using the number of occurrences of the set of predicates and the number of occurrences of the expressed relationship, a confidence value;
   assigning the confidence value to the expressed relationship;
   regarding the expressed relationship as a sentence; and
   counting, in the number of occurrences of the expressed relationship, only those occurrences where an entirety of the sentence appears in the unstructured data.

2. The method of claim 1, further comprising:
   normalizing the set of predicates into a single complex predicate; and
   counting, in the number of occurrences of the set of predicates, an occurrence where the complex predicate appears in the unstructured data in relation with a second subset of tokens in the set of tokens.

3. The method of claim 1, further comprising:
   using a logarithm of the number of occurrences of the set of predicates as a crude confidence value of the expressed relationship, wherein the crude confidence value is unadjusted for a diversity in styles of expressions in the unstructured data, and wherein the confidence value accounts for the diversity in the styles of the expressions in the unstructured data.

4. The method of claim 1, further comprising:
computing a logarithm of the number of occurrences of the set of predicates;
computing an inverse of the number of occurrences of the expressed relationship; and
multiplying the logarithm of the number of occurrences of the set of predicates with the inverse of the number of occurrences of the expressed relationship to obtain the confidence value.

5. The method of claim 1, further comprising:
parsing, using a parser application, using an existing language model, the unstructured data to generate a parse tree;
creating, from the parse tree, the set of tokens, wherein a token in the set of tokens comprises a set of words found in the unstructured data;
inserting the set of tokens in the existing language model to form an enhanced language model;
re-parsing the unstructured data using the enhanced language model to create the knowledge graph.

6. The method of claim 5, further comprising:
identifying, as a branch in the knowledge graph a set of edges between the tokens in the subset, each edge in the set of edges using a corresponding predicate in a set of predicates;
collapsing the branch of the knowledge graph such that the subset of tokens become related by a single edge representing the set of predicates.

7. The method of claim 6, further comprising:
concluding that a first token in the subset of tokens and a second token in a second subset of tokens are related in an inferred relationship, wherein tokens in the second subset are in a second expressed relationship according to collapsing a second branch in the knowledge graph;
identifying a common token, wherein the branch leads from the common token to the first token and the second branch leads from the common token to the second token; and
making the common token a condition of the inferred relationship.

8. The method of claim 7, further comprising:
assigning a second confidence value to the second expressed relationship; and
assigning a confidence value range to the inferred relationship, wherein a lower bound of the confidence value range is a value that is lower of the confidence value and the second confidence value, and wherein an upper bound of the confidence value range is a value that is higher of the confidence value and the second confidence value.

9. The method of claim 7, further comprising:
determining that tokens in the second subset of tokens are related in the second expressed relationship by a second set of predicates;
determining, in the unstructured data, a number of occurrences of the second set of predicates;
determining, in the unstructured data, a number of occurrences of the second expressed relationship; and
computing, using the number of occurrences of the second set of predicates and the number of occurrences of the second expressed relationship, a second confidence value; and assigning the second confidence value to the second expressed relationship.

10. The method of claim 1, wherein the method is embodied in a computer program product comprising one or more computer-readable storage mediums and computer-readable program instructions which are stored on the one or more computer-readable storage mediums and executed by one or more processors.

11. The method of claim 1, wherein the method is embodied in a computer system comprising one or more processors, one or more computer-readable memories, one or more computer-readable storage mediums and program instructions which are stored on the one or more computer-readable storage mediums for execution by the one or more processors via the one or more memories and executed by the one or more processors.

12. A computer program product for confidence weighting relationships between complex entities in unstructured data, the computer program product comprising:
one or more computer-readable storage mediums;
program instructions, stored on at least one of the one or more storage mediums, to extract, from a knowledge graph corresponding to the unstructured data wherein the knowledge graph comprises a set of tokens, an expressed relationship between a subset of the set of tokens, wherein tokens in the subset of tokens are related in the expressed relationship by a set of predicates;
program instructions, stored on at least one of the one or more storage mediums, to determine, in the unstructured data, a number of occurrences of the set of predicates;
program instructions, stored on at least one of the one or more storage mediums, to determine, in the unstructured data, a number of occurrences of the expressed relationship;
program instructions, stored on at least one of the one or more storage mediums, to compute, using a processor and a memory, and using the number of occurrences of the set of predicates and the number of occurrences of the expressed relationship, a confidence value;
program instructions, stored on at least one of the one or more storage mediums, to assign the confidence value to the expressed relationship;
program instructions, stored on at least one of the one or more storage mediums, to regard the expressed relationship as a sentence; and
program instructions, stored on at least one of the one or more storage mediums, to count, in the number of occurrences of the expressed relationship, only those occurrences where an entirety of the sentence appears in the unstructured data.

13. The computer program product of claim 12, further comprising:
program instructions, stored on at least one of the one or more storage mediums, to normalize the set of predicates into a single complex predicate; and
program instructions, stored on at least one of the one or more storage mediums, to count, in the number of occurrences of the set of predicates, an occurrence where the complex predicate appears in the unstructured data in relation with a second subset of tokens in the set of tokens.

14. The computer program product of claim 12, further comprising:
program instructions, stored on at least one of the one or more storage mediums, to use a logarithm of the number of occurrences of the set of predicates as a crude confidence value of the expressed relationship, wherein the crude confidence value is unadjusted for a diversity in styles of expressions in the unstructured data, and wherein the confidence value accounts for the diversity in the styles of the expressions in the unstructured data.

15. The computer program product of claim 12, further comprising:
program instructions, stored on at least one of the one or more storage mediums, to compute a logarithm of the number of occurrences of the set of predicates;
program instructions, stored on at least one of the one or more storage mediums, to compute an inverse of the number of occurrences of the expressed relationship; and
program instructions, stored on at least one of the one or more storage mediums, to multiply the logarithm of the number of occurrences of the set of predicates with the inverse of the number of occurrences of the expressed relationship to obtain the confidence value.

16. The computer program product of claim 12, further comprising:
program instructions, stored on at least one of the one or more storage mediums, to parse, using a parser application, using an existing language model, the unstructured data to generate a parse tree;
program instructions, stored on at least one of the one or more storage mediums, to create, from the parse tree, the set of tokens, wherein a token in the set of tokens comprises a set of words found in the unstructured data;
program instructions, stored on at least one of the one or more storage mediums, to insert the set of tokens in the existing language model to form an enhanced language model;
program instructions, stored on at least one of the one or more storage mediums, to re-parse the unstructured data using the enhanced language model to create the knowledge graph.

17. The computer program product of claim 16, further comprising:
program instructions, stored on at least one of the one or more storage mediums, to identify, as a branch in the knowledge graph a set of edges between the tokens in the subset, each edge in the set of edges using a corresponding predicate in a set of predicates;
program instructions, stored on at least one of the one or more storage mediums, to collapse the branch of the knowledge graph such that the subset of tokens become related by a single edge representing the set of predicates.

18. A computer system for confidence weighting relationships between complex entities in unstructured data, the computer system comprising:

one or more processors, one or more computer-readable memories and one or more computer-readable storage mediums;

program instructions, stored on at least one of the one or more storage mediums for execution by at least one of the one or more processors via at least one of the one or more memories, to extract, from a knowledge graph corresponding to the unstructured data wherein the knowledge graph comprises a set of tokens, an expressed relationship between a subset of the set of tokens, wherein tokens in the subset of tokens are related in the expressed relationship by a set of predicates;

program instructions, stored on at least one of the one or more storage mediums for execution by at least one of the one or more processors via at least one of the one or more memories, to determine, in the unstructured data, a number of occurrences of the set of predicates;

program instructions, stored on at least one of the one or more storage mediums for execution by at least one of the one or more processors via at least one of the one or more memories, to determine, in the unstructured data, a number of occurrences of the expressed relationship;

program instructions, stored on at least one of the one or more storage mediums for execution by at least one of the one or more processors via at least one of the one or more memories, to compute, using a processor and a memory, and using the number of occurrences of the set of predicates and the number of occurrences of the expressed relationship, a confidence value;

program instructions, stored on at least one of the one or more storage mediums for execution by at least one of the one or more processors via at least one of the one or more memories, to assign the confidence value to the expressed relationship;

program instructions, stored on at least one of the one or more storage mediums, to regard the expressed relationship as a sentence; and program instructions, stored on at least one of the one or more storage mediums, to count, in the number of occurrences of the expressed relationship, only those occurrences where an entirety of the sentence appears in the unstructured data.

* * * * *